(12) United States Patent
Weaver et al.

(10) Patent No.: US 9,206,345 B2
(45) Date of Patent: Dec. 8, 2015

(54) WELLBORE SERVICING COMPOSITIONS AND METHODS OF MAKING AND USING SAME

(71) Applicant: Halliburton Energy Services, Inc., Houston, TX (US)

(72) Inventors: Jimmie D. Weaver, Duncan, OK (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 310 days.

(21) Appl. No.: 13/765,444

(22) Filed: Feb. 12, 2013

(65) Prior Publication Data

US 2014/0224492 A1    Aug. 14, 2014

(51) Int. Cl.
| | |
|---|---|
| E21B 33/13 | (2006.01) |
| E21B 43/22 | (2006.01) |
| C09K 8/575 | (2006.01) |
| C09K 8/506 | (2006.01) |
| C09K 8/68 | (2006.01) |
| C09K 8/80 | (2006.01) |
| E21B 33/138 | (2006.01) |

(52) U.S. Cl.
CPC ............... *C09K 8/5753* (2013.01); *C09K 8/506* (2013.01); *C09K 8/68* (2013.01); *C09K 8/80* (2013.01); *E21B 33/138* (2013.01)

(58) Field of Classification Search
CPC ........ C09K 8/512; C09K 8/68; C09K 8/5756; C09K 8/514; C09K 8/40; E21B 33/138; E21B 43/025; E21B 43/26; E21B 43/267; E21B 43/04
See application file for complete search history.

(56) References Cited

U.S. PATENT DOCUMENTS

| | | |
|---|---|---|
| 6,364,016 B1 | 4/2002 | Dalrymple et al. |
| 6,476,169 B1 | 11/2002 | Eoff et al. |
| 6,843,841 B2 | 1/2005 | Reddy et al. |
| 7,114,568 B2 | 10/2006 | Eoff et al. |

(Continued)

FOREIGN PATENT DOCUMENTS

EP        0933414 A1    8/1999

OTHER PUBLICATIONS

Foreign communication from a related counterpart application—International Search Report and Written Opinion, PCT/US2014/015324, Apr. 2, 2014, 10 pages.

(Continued)

*Primary Examiner* — Zakiya W Bates
(74) *Attorney, Agent, or Firm* — Holly Soehnge; Baker Botts L.L.P.

(57) ABSTRACT

A method of servicing a wellbore in a subterranean formation comprising tethering a relative permeability modifier to one or more surfaces of the formation via a coupling agent. A method of servicing a wellbore in a subterranean formation comprising introducing into the wellbore a first wellbore servicing fluid comprising a coupling agent; allowing the coupling agent to associate with the surface of the formation; introducing into the wellbore a second wellbore servicing fluid comprising a relative permeability modifier; and allowing the relative permeability modifier to associate with the coupling agent. A method of servicing a wellbore in a subterranean formation comprising placing into the formation a wellbore servicing fluid comprising a coupling agent and a relative permeability modifier; and allowing the relative permeability modifier to associate with the formation.

20 Claims, 1 Drawing Sheet

(56) References Cited

U.S. PATENT DOCUMENTS

| | | |
|---|---|---|
| 7,128,148 B2 | 10/2006 | Eoff et al. |
| 7,159,656 B2 | 1/2007 | Eoff et al. |
| 7,182,136 B2 | 2/2007 | Dalrymple et al. |
| 7,493,957 B2 | 2/2009 | Nguyen et al. |
| 8,183,186 B2 | 5/2012 | Luo et al. |
| 2004/0177957 A1 | 9/2004 | Kalfayan et al. |
| 2004/0231847 A1* | 11/2004 | Nguyen et al. ............ 166/295 |
| 2006/0065396 A1 | 3/2006 | Dawson et al. |
| 2009/0093382 A1 | 4/2009 | Brannon et al. |

OTHER PUBLICATIONS

International Preliminary Report on Patentability issued in related PCT Application No. PCT/US2014/015324, mailed Aug. 27, 2015 (9 pages).

* cited by examiner

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of modifying the permeability of a portion of a subterranean formation.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may be pumped down the casing to the formation at a rate and a pressure sufficient to form fractures that extend into the formation, providing additional pathways through which the oil or gas can flow to the well. Unfortunately, water along with oil or gas may eventually be produced by the formation through the fractures therein. In such cases, the formation may be treated with a relative permeability modifier (RPM) that is meant to control water production, shut off water-producing intervals, and/or enhance hydrocarbon production. A challenge to the use of conventional RPMs is that they do not adhere strongly to the formation surface, and consequently are not effective long term. Thus, an ongoing need exists for more effective compositions and methods for utilizing RPMs in subterranean formations.

SUMMARY

Disclosed herein is a method of servicing a wellbore in a subterranean formation comprising tethering a relative permeability modifier to one or more surfaces of the formation via a coupling agent.

Also disclosed herein is a method of servicing a wellbore in a subterranean formation comprising introducing into the wellbore a first wellbore servicing fluid comprising a coupling agent, allowing the coupling agent to associate with the surface of the formation, introducing into the wellbore a second wellbore servicing fluid comprising a relative permeability modifier, and allowing the relative permeability modifier to associate with the coupling agent.

Also disclosed herein is a method of servicing a wellbore in a subterranean formation comprising placing into the formation a wellbore servicing fluid comprising a coupling agent and a relative permeability modifier, and allowing the relative permeability modifier to associate with the formation.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing methods comprising modifying the relative permeability of at least a portion of a subterranean formation. In an embodiment, the method comprises introducing to the formation one or more coupling agents and one or more relative permeability modifiers (RPMs). For example, a method of modifying the permeability of at least a portion of a subterranean formation comprises placing into the wellbore a first wellbore servicing fluid (WSF) comprising a coupling agent. The wellbore may then be shut in for some user and/or process-desired time period. The method may further comprise introducing to the wellbore a second WSF comprising a RPM.

Figure 1A:
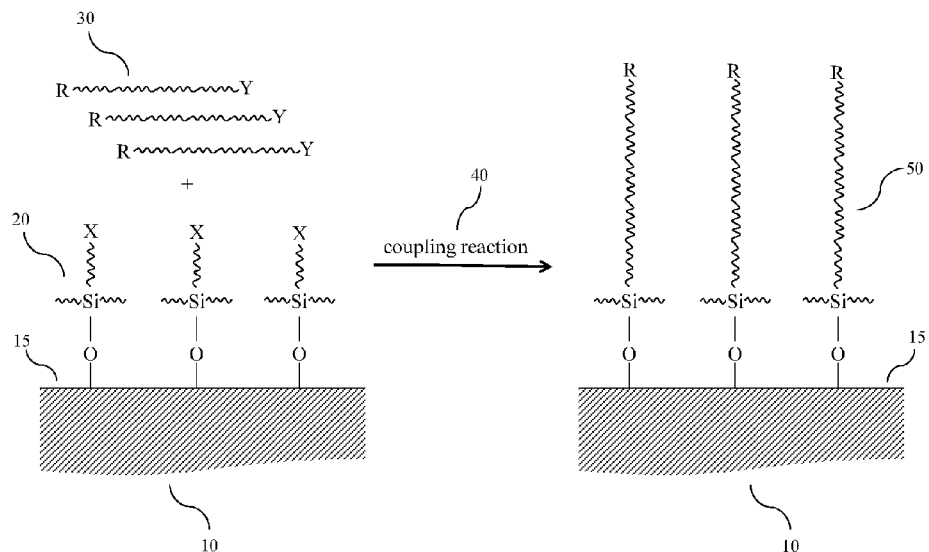
FIGS. 1A and 1B are graphical representations of the methodologies disclosed herein.

Referring to FIG. 1A, in one embodiment, a method of servicing a wellbore in accordance with the present disclosure comprises introducing a coupling agent 20 to a wellbore 10 where it may covalently bond to one or more surfaces of the wellbore 15. The method may further comprise introducing to the wellbore a RPM 30 which can engage in a coupling reaction 40 with the coupling agent 20 to form a tethered RPM 50. Additional methods and compositions for modifying the relative permeability of the formation are described in more detail herein.

In an embodiment, a method of servicing a wellbore comprises drilling a wellbore in a subterranean formation and introducing to the formation WSF. As used herein, a "servicing fluid" refers to a fluid used to drill, complete, work over, fracture, gravel pack, repair, or in any way prepare a wellbore for the recovery of materials residing in a subterranean formation penetrated by the wellbore. The WSF is for use in a wellbore that penetrates a subterranean formation. It is to be understood that "subterranean formation" encompasses both areas below exposed earth and areas below earth covered by water such as ocean or fresh water.

Examples of WSFs include, but are not limited to, completion fluids, fracturing fluids, gravel-packing fluids, lost circulation fluids, spacer fluids, drilling fluids or muds. In an embodiment, the WSF comprises an aqueous-based fluid. Herein, an aqueous-based fluid refers to a fluid having equal to or less than about 20 vol. %, 15 vol. %, 10 vol. %, 5 vol. %, 2 vol. %, or 1 vol. % of a non-aqueous fluid based on the total volume of the WSF. Aqueous-based fluids that may be used in the WSF include any aqueous fluid suitable for use in subterranean applications. For example, the WSF may comprise water or a brine.

In an embodiment, the aqueous-based fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, or combinations thereof. The salt or salts in the water may be present in an amount ranging from greater than about 0% by weight (wt. %) to a saturated salt solution, alternatively from about 0.01 wt. % to about 10 wt. %, or alternatively from about 0.1 wt. % to about 5 wt. % based on the total weight of the solution. In an embodiment, the salt or salts in the water may be present within the aqueous-based fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. The choice of brine may be dictated by a variety of factors such as the formation condition and the desired density of the resulting solution.

The WSF may comprise additional additives as deemed appropriate for improving the properties of the fluid. Such additives may vary depending on the intended use of the fluid in the wellbore. Examples of such additives include, but are not limited to, emulsifiers, lime, organic/inorganic viscosifiers, weighting agents, glass fibers, carbon fibers, suspending agents, conditioning agents, dispersants, water softeners, oxidation and corrosion inhibitors, thinners, acid gas scavengers or combinations thereof. These additives may be introduced singularly or in combination using any suitable methodology and in amounts effective to produce the desired improvements in fluid properties.

In an embodiment, the WSF comprises a preflush fluid. Such preflush fluids may be aqueous-based or hydrocarbon-based fluids that function to prepare the formation surface and facilitate the reaction of the coupling agent with the formation and/or RPM. In an embodiment, the preflush fluid comprises a brine, a mutual solvent, a surfactant, or combinations thereof. Brines suitable for use in the preflush fluid include without limitation the aqueous brines previously disclosed herein. Herein a mutual solvent is defined as a material that is soluble in oil, water, and acid-based treatment fluids. Given that the mutual solvent is miscible with more than one class of liquids, such materials can cause two ordinarily immiscible liquids to combine with each other. Mutual solvents include for example and without limitation glycol ethers such as ethylene glycol monobutylether (EGMBE) or propylene glycol monobutylether; methanol; isopropyl alcohol; alcohol ethers; aldehydes; ketones; aromatic solvents; derivatives thereof; and combinations thereof. Examples of commercially available mutual solvents include MUSOL mutual solvent sold by Halliburton Energy Services, SOL-15 sold by Fracmaster Ltd., and SUPER-SOL sold by Osca.

In an embodiment the preflush fluid comprises an aqueous fluid and a surfactant. The aqueous-fluid component may be fresh water, salt water, brine, or seawater, or any other aqueous-based fluid that does not adversely react with the other components used in accordance with this disclosure or with the subterranean formation. Examples of surfactants suitable for use in the preflush fluid include without limitation ethoxylated nonyl phenol phosphate esters, mixtures of one or more cationic surfactants, one or more non-ionic surfactants, an alkyl phosphonate surfactant, wherein the alkyl chain has a length in the range of from about 12 to about 22 carbon atoms, or combinations thereof.

In an embodiment, the method comprises placing into a wellbore within a subterranean formation a WSF of the type disclosed herein comprising a coupling agent. In an embodiment, the coupling agent is a multifunctional compound comprising two or more reactive moieties that can form covalent bonds with other molecules. Alternatively, in an embodiment, the coupling agent is a bifunctional compound comprising two reactive moieties that can form covalent bonds with other molecules. In an embodiment, a coupling agent suitable for use in the present disclosure is able to covalently bond to both the surface of the subterranean formation and to a RPM under the conditions present in the wellbore. For example the coupling agent may be reactive at wellbore temperatures ranging from about 65° F. to about 500° F., alternatively from about 100° F. to about 350° F. or alternatively from about 125° F. to about 250° F. and wellbore pressures ranging from about 200 psi to about 15,000 psi, alternatively from about 1,000 psi to about 10,000 psi, or alternatively from about 1,500 psi to about 5,000 psi.

In an embodiment, the coupling agent serves as a material that tethers the RPM to the subterranean formation. Referring to FIG. 1A, in an embodiment, the coupling agent 20 forms at least one bond with a surface 15 present within a subterranean formation 10 and one bond with a RPM via coupling reaction 40.

In an embodiment, the coupling agent comprises silanes, vinyl silanes, epoxy silanes, amino silanes, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

Nonlimiting examples of vinyl silanes suitable for use in the present disclosure include vinyl silane, vinyltrichlorosilane, vinyltrimethoxysilane, vinyltriethoxysilane, vinyltris (2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane or combinations thereof.

Nonlimiting examples of epoxy silanes suitable for use in the present disclosure include 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, or combinations thereof.

Nonlimiting examples of amino silanes suitable for use in the present disclosure include N-(3-triethoxysilylpropyl)amine, 3-aminopropylsilanetriol, bis[(3-triethoxysilyepropyl]amine, N-(3-trimethoxysilylpropyl)amine, bis[(3-trimethoxysilyepropyl]amine, N-(3-methyldimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-(3-(trimethoxysilyl)-propylcyclohexylamine, N-(3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)aniline, diethylaminomethyltriethoxysilane, diethylaminomethyldiethoxysilane, 3-(trimethoxysilylpropyl)diethylamine, 3-(N,N-dimethylaminopropyl)-aminopropylmethyldimethoxysilane, or combinations thereof.

In an embodiment a coupling agent of the type disclosed herein may be present in the WSF in an amount of from about 0.01 wt. % to about 10 wt. %, alternatively from about 0.1 wt. % to about 5 wt. %, or alternatively from about 0.5 wt. % to about 2 wt. %, based on the total weight of the WSF.

In an embodiment, the WSF comprising a coupling agent once introduced to the formation is allowed to react with the surface of the formation. In an embodiment, the formation comprises sedimentary rocks such as shale, mudstone, limestone, sandstone, chalk, or combinations thereof. The coupling agent may react under wellbore conditions with silicon-containing materials found the sedimentary rock such as quartz, silica, feldspar, quartzite, orthoquartzite, or combinations thereof.

While in the embodiment of FIG. 1A the Si atoms are attached to the formation surface 15 via —Si—O— type bonds, it is to be understood, that some of the Si atoms are anchored (i.e., covalently bound) to the formation surface via other types of covalent bonds. Further, while in the embodiments of FIGS. 1A and 1B the Si atoms are not connected to each other it is to be understood that some of the Si atoms that are anchored (i.e., covalently bound) to the formation may also be covalently bonded to each other (e.g., via —Si—O—Si— type bonds).

In an embodiment, after introduction of the coupling agent to the formation the well may be shut-in for some period of time to afford the coupling agent sufficient time to react with the surface of the formation. "Shutting-in" the wellbore refers to closing of the wellbore to prevent or minimize any fluid movement in the treated formation interval.

In an embodiment, the well may be shut-in for a time period in the range of from about 1 to about 48 hrs, alternatively from about 4 hrs to about 24 hrs, or alternatively from about 8 hrs to about 12 hrs.

In an embodiment, the method comprises introducing to the formation a second WSF comprising a RPM. For example and with reference to FIG. 1A, the second WSF may comprise an aqueous fluid comprising the RPM 30 that is introduced to a wellbore 10 comprising coupling agents 20 that are associated with surface of the wellbore 15. RPMs herein refer to materials used to reduce a subterranean formation's effective permeability to water while minimally impacting the subterranean formation's effective permeability to oil and/or gas. In an embodiment, the RPM comprises a water-soluble unmodified polymer; a water-soluble; hydrophilically modified polymer; a water-soluble, hydrophobically modified polymer; an in situ formed polymer; copolymers thereof; blends thereof; derivatives thereof; or combinations thereof. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. The term "derivative" is defined herein to include any compound that is made from one or more of the RPMs, for example, by replacing one atom in the RPM with another atom or group of atoms, rearranging two or more atoms in the RPM, ionizing one of the RPMs, or creating a salt of one of the RPMs. The term "copolymer" as used herein is not limited to the combination of two polymers, but includes any combination of polymers, e.g., graft polymers, terpolymers and the like. RPMs are described in more detail in U.S. Pat. Nos. 6,364,016; 6,476,169; 7,114,568; 7,182,136; and 7,493,957, each of which is incorporated by reference herein in its entirety.

In an embodiment, the RPM comprises a water-soluble polymer with or without hydrophobic or hydrophilic modification. As used herein, "water-soluble" refers to at least about 0.01 wt. %, alternatively at least about 0.1 wt. %, or alternatively at least about 1 wt. % solubility in distilled water. A water-soluble polymer with hydrophobic modification is referred to herein as a "water-soluble, hydrophobically modified polymer." As used herein, the term "hydrophobic modification," or "hydrophobically modified," refers to the incorporation into the hydrophilic polymer structure of hydrophobic groups comprising alkyl chain groups with a length from about 4 to about 22 carbons, alternatively from about 7 to about 22 carbons, or alternatively from about 12 to about 18 carbons. A water-soluble polymer with hydrophilic modification is referred to herein as a "water-soluble, hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer.

In some embodiments, the RPM polymers comprise a polymer backbone comprising polar heteroatoms. Nonlimiting examples of polar heteroatoms that may be present within the polymer backbone of the RPM polymers suitable for use in the present disclosure include oxygen, nitrogen, sulfur, phosphorous or combinations thereof.

RPM polymers suitable for use in the present disclosure may have molecular weights in the range of from about 10,000 Da to 10,000,000 Daltons, alternatively from about 100,000 Da to about 10,000,000 Da, alternatively from about 10,000 Da to about 1,000,000 Da, or alternatively from about 1,000 Da to about 100,000 Da.

In an embodiment, the RPM comprises a water-soluble unmodified polymer, i.e., a water-soluble polymer without hydrophobic or hydrophilic modification. Nonlimiting examples of water-soluble unmodified polymers suitable for use in the present disclosure include polyacrylamide, poly(2-acrylamido-2-methyl propane sulfonic acid), poly(N,N-dimethylacrylamide), polyvinyl pyrrolidone, poly(dimethylaminoethyl methacrylate), polyacrylic acid, polydimethylaminopropylmethacrylamide, polyvinyl amine, polyvinyl acetate, poly(trimethylammoniumethyl methacrylate chloride), polymethacrylamide, polyhydroxyethylacrylate, poly(amino methacrylate), poly(alkyl amino methacrylate), polyhydroxymethylacrylate, polyhydroxyethylmethacrylate, poly(N-hydroxymethylacrylamide), poly(N-hydroxymethylmethacrylamide), polyethylene acrylate, polyethylene methacrylate, polyethylene glycol acrylate, polyethylene glycol methacrylate, polypropylene gylcol acrylate, polypropylene glycol methacrylate, poly(hydroxyethylcellulose-vinyl phosphoric acid), polyvinyl sulfonic acid, polyvinyl phosphonic acid, polymethacrylic acid, polyvinyl caprolactam, poly(N-vinylformamide), poly(N,N-diallylacetamide), poly(dimethyldiallyl ammonium halide), polyitaconic acid, polystyrene sulfonic acid, poly(methacrylamidoethyltrimethyl ammonium halide), quaternary salt derivatives of polyacrylamide, quaternary salt derivatives of polyacrylic acid, or combinations thereof.

In an embodiment, the RPM comprises a water-soluble, hydrophilically modified polymer. The water-soluble, hydrophilically modified polymers may be synthesized using any suitable method. In an embodiment, the water-soluble, hydrophilically modified polymers may be a reaction product of a hydrophilic polymer and a hydrophilic compound. Those of ordinary skill in the art, with the benefit of this disclosure, will be able to determine other suitable methods for the preparation of suitable water-soluble, hydrophilically modified polymers.

In an embodiment, the hydrophilic polymers comprise polyacrylamides, hydrolyzed polyacrylamides, polyvinylamines, poly(vinylamines/vinyl alcohols), alkyl acrylate polymers, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide), or combinations thereof. In an embodiment, hydrophilic polymers of the type described herein may be used for obtaining other water-soluble modified polymers besides water-soluble, hydrophilically modified polymers, such as water-soluble, hydrophobically modified polymers, as will be described in more detail later herein.

In an embodiment, hydrophilic compounds suitable for reacting with the hydrophilic polymers comprise polyethers comprising halogens, sulfonates, sulfates, organic acids, and organic acid derivatives. Nonlimiting examples of polyethers suitable for use in the present disclosure include polyethylene oxides, polypropylene oxides, and polybutylene oxides, or combinations thereof. In an embodiment, the polyether comprises an epichlorohydrin-terminated polyethylene oxide methyl ether.

In some embodiments, the hydrophilic polymers comprise a polymer backbone and reactive amino groups in the polymer backbone or as pendant groups, where the reactive amino groups are capable of reacting with either hydrophilic compounds or hydrophobic compounds. In other embodiments, the hydrophilic polymers comprise dialkyl amino pendant groups. In other embodiments, the hydrophilic polymers comprise a dimethyl amino pendant group and at least one monomer comprising dimethylaminoethyl methacrylate or dimethylaminopropyl methacrylamide. Nonlimiting examples of hydrophilic polymers comprising polar heteroatoms within the polymer backbone suitable for use in the present disclosure include celluloses, chitosans, polyamides, polyetheramines, polyethyleneimines, polyhydroxyetheramines, polylysines, polysulfones, gums, starches, derivatives thereof, or combinations thereof.

In an embodiment, a water-soluble, hydrophilically modified polymer may have a weight ratio of hydrophilic polymers to polyethers in the range of from about 1:1 to about 10:1, alternatively from about 2:1 to about 5:1, or alternatively from about 2:1 to about 3:1. In an embodiment, the water-soluble, hydrophilically modified polymer comprises the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; the reaction product of poly(acrylamide/dimethylaminopropyl methacrylamide) and epichlorohydrin-terminated polyethyleneoxide methyl ether; or combinations thereof.

In an embodiment, the RPM comprises a water-soluble, hydrophobically modified polymer. While these hydrophobically modified polymers have hydrophobic groups incorporated into the hydrophilic polymer structure, those suitable for use in the present disclosure are water-soluble.

The water-soluble, hydrophobically modified polymers may be synthesized using any suitable method. In an embodiment, the water-soluble, hydrophobically modified polymers may be a reaction product of a hydrophilic polymer and a hydrophobic compound, i.e., hydrophobic modification. In such embodiment, the hydrophilic polymer is of the type described previously herein.

Nonlimiting examples of hydrophobic compounds suitable for use in the present disclosure include alkyl halides; alkyl sulfonates; alkyl sulfates; organic acids; organic acid derivatives; octenyl succinic acid; dodecenyl succinic acid; anhydrides thereof, esters thereof, imides thereof, amides thereof, or combinations thereof. In some embodiments, the hydrophobic compounds comprise alkyl groups with a chain length ranging from about 4 to about 22 carbon atoms, alternatively from about 7 to about 22 carbons, or alternatively from about 12 to about 18 carbons. In an embodiment, the hydrophobic compounds of the type described herein may be used for the hydrophobic modification of other compounds besides a hydrophilic polymers, such as, hydrophilic monomers as will be described in more detail later herein.

When the hydrophobic compound is an alkyl halide, for example, the reaction between the hydrophobic compound and hydrophilic polymer may result in the quaternization of at least some of the hydrophilic polymer amino groups with an alkyl halide, wherein the alkyl chain length is from about 4 to about 22 carbons, alternatively from about 7 to about 22 carbons, or alternatively from about 12 to about 18 carbons.

In an embodiment, the water-soluble, hydrophobically modified polymer comprises a hydrophilic monomer and a hydrophobic compound in a mole ratio ranging from about 99.98:0.02 to about 90:10 (hydrophilic monomer to hydrophobic compound), alternatively from about 80 to about 20, or alternatively from about 70 to about 30, wherein the hydrophilic monomer is a calculated amount present in the hydrophilic polymer. In another embodiment, the water-soluble, hydrophobically modified polymer may be prepared from a polymerization reaction comprising a hydrophilic monomer of the type described previously herein and a hydrophobically modified hydrophilic monomer of the type described previously herein. Methods for preparing water-soluble, hydrophobically modified polymers are described in more detail in U.S. Pat. No. 6,476,169, which is incorporated by reference herein in its entirety. Those of ordinary skill in the art, with the benefit of this disclosure, will be able to determine other suitable methods for the synthesis of suitable water-soluble, hydrophobically modified polymers.

In an embodiment, the water-soluble, hydrophobically modified polymers comprise acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, acrylamide/2-acrylamido-2-methyl propane sulfonic acid/2-ethylhexyl methacrylate terpolymer, amino methacrylate/alkyl amino methacrylate copolymer, dimethylaminoethyl methacrylate/alkyl-dimethylammoniumethyl methacrylate copolymer, dimethylaminoethyl methacrylate/hexadecyl-dimethylammoniumethyl methacrylate copolymer, dimethylaminoethyl methacrylate/hexadecyl-dimethylammoniumethyl methacrylate bromide copolymer or combinations thereof.

In an embodiment, the RPM comprises an in situ formed polymer. In an embodiment, the RPM may be formed in situ by introducing to the wellbore a mixture comprising a water-soluble polymerizable organic monomer, an oxygen scavenger, and a polymerization initiatior.

In an embodiment, the mixture comprises a water-soluble polymerizable organic monomer. In an embodiment, the water-soluble polymerizable organic monomer comprises a hydrophilic monomer, a hydrophobically modified hydrophilic monomer, or combinations thereof. In some embodiments, the hydrophobically modified hydrophilic monomer may be a reaction product of a hydrophilic monomer and a hydrophobic compound of the type previously described herein.

Nonlimiting examples of hydrophilic monomers suitable for use in the present disclosure include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, hydroxymethylacrylate, hydroxyethylmethacrylate, ethylene acrylate, ethylene methacrylate, polyethylene glycol acrylate, polyethylene glycol methacrylate, polypropylene gylcol acrylate, polypropylene glycol methacrylate, amino methacrylate, alkyl amino methacrylate, N-hydroxymethylacrylamide, N-hydroxymethylmethacrylamide, vinyl sulfonic acid, vinyl phosphonic acid, hydroxyethylcellulose-vinyl phosphoric acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, or combinations thereof.

In an embodiment, the hydrophobically modified hydrophilic monomers comprise alkyl acrylates, alkyl methacrylates, alkyl acrylamides, alkyl methacrylamides alkyl dimethylammoniumethyl methacrylate halides, alkyl dimethylammoniumpropyl methacrylamide halides, or combinations thereof. In such embodiment, the alkyl groups comprise from about 4 to about 22 carbon atoms, alternatively from about 7 to about 22 carbons, or alternatively from about 12 to about 18 carbons. In an embodiment, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, hexadecyl methacrylamide, or combinations thereof.

The water-soluble polymerizable organic monomer may be present in the mixture in an amount of from about 0.01 wt. % to about 20 wt. %, alternatively from about 0.1 wt. % to about 10 wt. % or alternatively from about 1 wt. % to about 5 wt. %, based on the total weight of the mixture.

In an embodiment, the mixture comprises an oxygen scavenger. Nonlimiting examples of oxygen scavengers suitable for use in the present disclosure include stannous chloride, sulfite, tannin, carbohydrazide, or combinations thereof.

The oxygen scavenger may be present in the mixture in an amount of from about 0.005 wt. % to about 0.1 wt. %, alternatively from about 0.01 wt. % to about 0.075 wt. %, or alternatively from about 0.02 wt. % to about 0.05 wt. %, based on the total weight of the polymerization mixture.

In an embodiment, the mixture comprises a polymerization initiator. Nonlimiting examples of polymerization initiators suitable for use in the present disclosure include 2,2'-azobis(2-imidazole-2-hydroxyethyl)propane; 2,2'-azobis(2-aminopropane); 4,4'-azobis(4-cyanovaleric acid); 2,2'-azobis(2-methyl-N-(2-hydroxyethyl)propionamide, or combinations thereof.

The polymerization initiator may be present in the mixture in an amount of from about 0.1 wt. % to about 5 wt. %, alternatively from about 0.2 wt. % to about 3 wt. %, or alternatively from about 0.5 wt. % to about 1 wt. %, based on the total weight of the mixture.

In an embodiment, the RPM may be included within the second WSF in any suitable amount. In an embodiment an RPM of the type disclosed herein may be present within the second WSF in an amount of from about 0.01 wt. % to about 10 wt. %, alternatively from about 0.1 wt. % to about 3 wt. %, or alternatively from about 0.5 wt. % to about 1 wt. %, based on the total weight of the WSF.

In an embodiment, after introduction of the second WSF comprising an RPM of the type disclosed herein to the formation the well may be shut-in for some period of time to afford the RPM sufficient time to react with the coupling agent and/or the surface of the formation. In an embodiment, the well may be shut-in for a time period in the range of from about 1 hour to about 48 hrs, alternatively from about 4 hrs to about 24 hrs, or alternatively from about 8 hrs to about 12 hrs. As will be understood by one of ordinary skill in the art, an RPM introduced to the wellbore containing the coupling agent bound to the surface of the formation may react with the coupling agent and/or the surface of the formation. In some embodiments, at least a portion of the RPM introduced to the formation may form a non-covalent association with the surface of the formation.

In an alternative embodiment, a method of modifying the permeability of at least a portion of a subterranean formation comprises introducing to the formation a WSF comprising a coupling agent and an RPM, both of the type described herein.

Figure 1B:
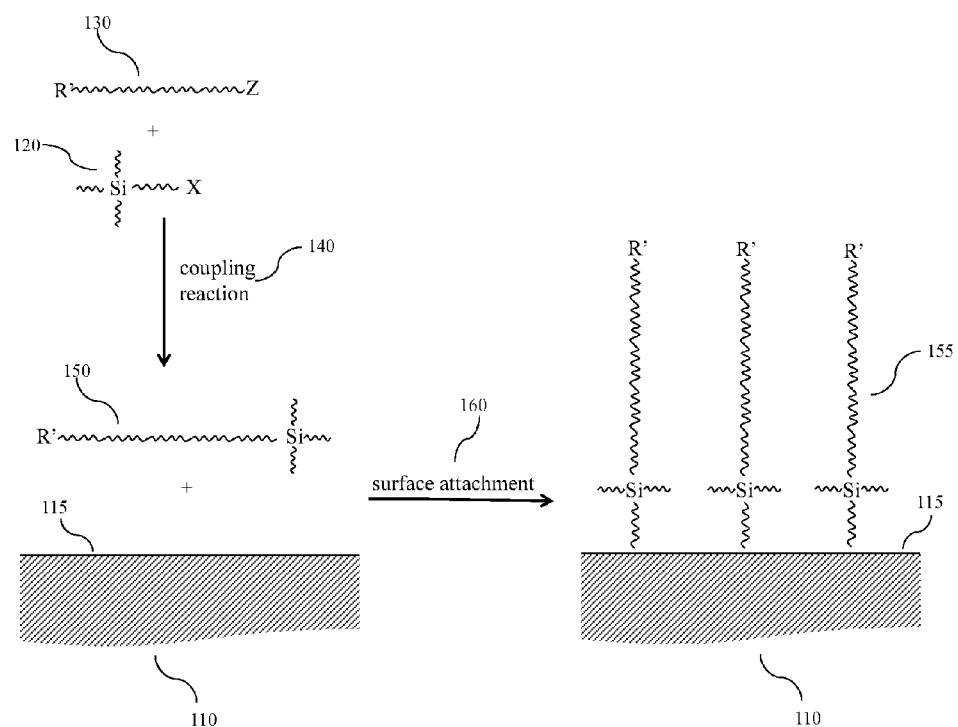

For example, the RPM may comprise an in situ formed polymer obtained from a polymerization mixture of the type previously described herein. In such embodiments, the polymerization reaction of the monomer to form the RPM may be initiated prior to placement in the wellbore, and/or prior to attachment of the coupling agent to the formation. Referring to FIG. 1B, the coupling agent 120 may be incorporated into the polymer backbone of the RPM 130 (e.g., via a coupling reaction 140) to form a RPM/coupling agent moiety 150 prior to association of the RPM/coupling agent moiety (e.g., surface attachment 160) with the formation surface 115. In an alternative embodiment, the monomer may be partially polymerized (e.g., in the form of oligomers) prior to contacting with a coupling agent, and the coupling agent 120 may be incorporated into the polymer backbone of the RPM 130 (e.g., via a coupling reaction 140) to form a RPM/coupling agent moiety 150 prior to association of the RPM/coupling agent moiety (e.g., surface attachment 160) with the formation surface 115.

In yet another embodiment, and with reference to FIG. 1B, a polymer 130 (e.g., water-soluble unmodified polymer; water-soluble, hydrophilically modified polymer; water-soluble, hydrophobically modified polymer) may react with the coupling agent 120 prior to placement in the wellbore, leading to formation of a RPM/coupling agent moiety 150 prior to association of the RPM/coupling agent moiety (e.g., surface attachment 160) with the formation surface 115. In such an embodiment, the reaction between the coupling agent and the RPM may not be completed prior to the molecules contacting the surface of the formation, thus a portion of the coupling agent may be available to react with and attach to the formation surface prior to coupling to RPM.

In embodiments where the coupling agent and RPM are introduced to the formation in a single WSF, the wellbore may be shut-in after the introduction of the WSF for a period of time as deemed appropriate by the operator to allow for an appropriate reaction time (e.g., polymerization of a monomer to form the RPM, reaction of a coupling agent and/or RPM). In an embodiment, the well may be shut-in for a time period in the range of from about 1 hour to about 48 hrs, alternatively from about 4 hrs to about 24 hrs, or alternatively from about 8 hrs to about 12 hrs.

While in the embodiments of FIGS. 1A and 1B each of RPMs is coupled to only one Si atom, it will be apparent to one of ordinary skill in the art, with the help of this disclosure, that some RPMs comprise multiple sites in their polymeric structure that could react and couple to more than one coupling agent, i.e., anchor to the formation surface in more than one point along the polymeric molecule. Similarly, when the polymerization mixture is being polymerized in the presence of the coupling agents, more than one coupling agent may get incorporated into the polymer backbone, thus providing more than one anchoring point for the RPM.

In an embodiment a method of servicing a wellbore comprises placing into a wellbore penetrating a subterranean formation comprising limestone a preflush fluid comprising an epoxy silane. The wellbore may then be shut-in at a pressure of from about 200 psi to about 2,000 psi and a shut-in temperature of from about 125° F. to about 275° F. for a time period of from about 1 hour to about 48 hrs. The method may further comprise opening the wellbore and placing downhole a fracturing fluid comprising a proppant and an RPM comprising an acrylamide polymer. The wellbore may then be shut-in at a pressure of from about 500 psi to about 1,000 psi and a shut-in temperature of from about 150° F. to about 225° F. for a time period of from about 4 hrs to about 24 hrs.

In an embodiment, the coupling agent comprises vinyl silane and the RPM comprises a hydrophilically modified polymer. The coupling agent may be introduced to the wellbore as part of an aqueous-based WSF and the wellbore subsequently shut-in for a period of time ranging from about 8 hrs to about 24 hours. A second WSF comprising the RPM may then be introduced to the formation and the wellbore subsequently shut-in for a period of time ranging from about 4 hrs to about 24 hrs.

The methodologies disclosed herein result in at least a portion of the RPM introduced to the wellbore being tethered to the formation surface. In an embodiment, the RPM is covalently bonded to the coupling agent which is covalently bonded to a surface of the formation. Without wishing to be limited by theory, the coupling agent may be disposed between the RPM and the surface such that the coupling agent, represented by the letter B, is disposed between the formation, represented by the letter A, and the RPM represented by the letter C. The resulting formation-coupling agent—RPM association is designated the A-B-C permeability modifying complex.

In an embodiment, a method of servicing a wellbore comprises introducing to the wellbore a first WSF (e.g., a preflush or pad fluid) comprising a coupling agent of the type disclosed herein. The method may further comprise shutting in the wellbore for a time period sufficient to allow the coupling agent to react with the surface of the formation. In an embodiment, the method further comprises introducing to the wellbore a second WSF comprising an RPM of the type disclosed herein. In an embodiment, the second WSF is a fracturing fluid. As will be understood by one of ordinary skill in the art, the particular composition of a fracturing fluid will be dependent on the type of formation that is to be fractured. Fracturing fluids in addition to surfactants typically comprise an aqueous fluid (e.g., water), a proppant, acid, friction reducers, gelling agents, scale inhibitors, pH-adjusting agents, oxygen scavengers, breakers, crosslinkers, iron-control agents, corrosion inhibitors, bactericides and the like.

In an embodiment, the fracturing fluid comprises a proppant. In an embodiment, the proppant may comprise any suitable particulate material, which may be used to prop fractures open, i.e., a propping agent or a proppant. As used herein, a proppant refers to a particulate material that is suitable for use in a proppant pack or a gravel pack. When deposited in a fracture, the proppant may form a proppant pack, resulting in conductive channels through which fluids may flow to the wellbore. The proppant functions to prevent the fractures from closing due to overburden pressures.

Nonlimiting examples of proppants suitable for use in this disclosure include silica (sand), graded sand, Ottawa sands, Brady sands, Colorado sands; resin-coated sands; gravels; synthetic organic particles, nylon pellets, high density plastics, teflons, rubbers, resins; ceramics, aluminosilicates; glass; sintered bauxite; quartz; aluminum pellets; ground or crushed shells of nuts, walnuts, pecans, almonds, ivory nuts, brazil nuts, and the like; ground or crushed seed shells (including fruit pits) of seeds of fruits, plums, peaches, cherries, apricots, and the like; ground or crushed seed shells of other plants (e.g., maize, corn cobs or corn kernels); crushed fruit pits or processed wood materials, materials derived from woods, oak, hickory, walnut, poplar, mahogany, and the like, including such woods that have been processed by grinding, chipping, or other form of particleization; or combinations thereof. In an embodiment, the proppant comprises sand.

The proppants may be of any suitable size and/or shape. In an embodiment, a proppant suitable for use in the present disclosure may have an average particle size in the range of from about 2 to about 400 mesh, alternatively from about 8 to about 100 mesh, or alternatively about 10 to about 70 mesh, U.S. Sieve Series.

In an embodiment, a proppant may be present in the WSF in an amount of from about 0.1 pounds per gallon (ppg) to about 28 ppg, alternatively from about 0.1 ppg to about 14 ppg, or alternatively from about 0.1 ppg to about 8 ppg, based on the volume of the fracturing or gravel-packing fluid.

In an embodiment, the second WSF is a gravel-packing fluid. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the wellbore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed. In an embodiment, the gravel pack comprises a proppant material of the type previously described herein. Gravel packing is described in more detail in U.S. Pat. No. 8,183,186, which is incorporated by reference herein in its entirety.

In an embodiment, the coupling agent and RPM are introduced to the formation concurrently. The coupling agent and RPM may be introduced to the formation as components of a WSF such as a fracturing fluid or a gravel packing fluid.

The methods disclosed herein may be advantageously employed in the performance of one or more wellbore servicing operations. In an embodiment, an RPM that is a component of an A-B-C complex may have an increased wellbore lifetime when compared to an RPM that is not a component of a complex. Without wishing to be limited by theory, the wellbore lifetime of an RPM may be defined as the duration that the RPM can effectively control water production from the formation reservoir before the reservoir pressure depleted or after installation of mechanical pumps. For example, an RPM that is a component of an A-B-C permeability modifying complex (i.e., tethered) may have a wellbore lifetime that is increased by a factor of 2, alternatively, 5, 10, 50, or 100 when compared to an RPM that is not a component of an A-B-C permeability modifying complex (i.e., not tethered).

As a result of the RPM being covalently attached onto the formation surface (i.e., a component of a A-B-C permeability modifying complex), the method of modifying the relative permeability of at least a portion of a subterranean formation may advantageously require lower amounts of RPM to be supplied to the formation surface, when compared to the use of an RPM that is not a component of an A-B-C permeability modifying complex. For example, if an amount of RPM denoted x is required create a reduction in permeability denoted y, an RPM that is a component of an A-B-C permeability modifying complex to create a reduction in permeability of y will utilize about 0.5x, alternatively about 0.25x. The RPM that is a component of an A-B-C permeability modifying complex will advantageously remain anchored onto the formation, as opposed to washing away under sheer, such as in the case of conventional RPMs that are not covalently attached to the formation surface.

In an embodiment, the methods disclosed herein for modification of the relative permeability of at least a portion of a hydrocarbon-producing subterranean formation (i.e., use of an A-B-C permeability modifying complex) may advantageously inhibit or prevent the flow of water, while not significantly affecting the level of hydrocarbon production. For example, an A-B-C permeability modifying complex may be introduced to a wellbore as described herein and modify the relative permeability of at least a portion of a subterranean formation. This modification may result in the amount of water production by the formation being reduced by an amount ranging from about 5 vol. % to about 100 vol. %, vol. % to about 100 vol. %, alternatively from about 5 vol. % to about 95 vol. %, alternatively from about 25 vol. % to about 95 vol. %, alternatively from about 50 vol. % to about 95 vol. %, alternatively from about 75 vol. % to about 95 vol. %, alternatively from about 90 vol. % to about 99 vol. %, or alternatively from about 95 vol. % to about 98 vol. %, based on the total volume of water that would be flowing through the formation in the absence of the A-B-C permeability modifying complex. In an embodiment, in the presence of an A-B-C permeability modifying complex, the level of hydrocarbon production may be altered by less than about 20 vol. %, 15 vol. %, 10 vol. %, 5 vol. %, 2 vol. %, or 1 vol. %, based on the total volume of the produced hydrocarbon in the absence of an A-B-C permeability modifying complex.

In an embodiment, the methodologies disclosed herein for modification of the permeability of at least a portion of a subterranean formation (i.e., introduction of an A-B-C permeability modifying complex) may be advantageously used at bottom hole temperatures (BHTs) in the range of from about 75° F. to about 350° F., alternatively from about 125° F. to about 250° F. Additional advantages of the method of modifying the relative permeability of at least a portion of a subterranean formation may be apparent to one of skill in the art viewing this disclosure.

ADDITIONAL DISCLOSURE

The following enumerated embodiments are provided as non-limiting examples.

A first embodiment, which is a method of servicing a wellbore in a subterranean formation comprising tethering a relative permeability modifier to one or more surfaces of the formation via a coupling agent.

A second embodiment, which is the method of the first embodiment wherein tethering the relative permeability modifier to one or more surfaces of the formation comprises placing a first wellbore servicing fluid comprising the relative permeability modifier into the formation; and placing a second wellbore servicing fluid comprising the coupling agent into the wellbore.

A third embodiment, which is the method of any of the preceding embodiments wherein tethering the relative permeability modifier to one or more surfaces of the formation comprises placing a wellbore servicing fluid comprising the relative permeability modifier and coupling agent into the formation.

A fourth embodiment, which is the method of any of the preceding embodiments wherein the coupling agent comprises a multifunctional compound and the relative permeability modifier comprises a water-soluble unmodified polymer; a water-soluble, hydrophilically modified polymer; a water-soluble, hydrophobically modified polymer; an in situ formed polymer; copolymers thereof, blends thereof, derivatives thereof, or combinations thereof.

A fifth embodiment, which is a method of servicing a wellbore in a subterranean formation comprising introducing into the wellbore a first wellbore servicing fluid comprising a coupling agent; allowing the coupling agent to associate with the surface of the formation; introducing into the wellbore a second wellbore servicing fluid comprising a relative permeability modifier; and allowing the relative permeability modifier to associate with the coupling agent.

A sixth embodiment, which is the method of the fifth embodiment wherein allowing the coupling agent to associate with the surface of the formation; allowing the relative permability modifier to associate with the coupling agent or both comprises shutting-in the wellbore.

A seventh embodiment, which is the method of the sixth embodiment wherein the wellbore is shut-in for a period of time ranging from about 1 hour to about 48 hours.

An eighth embodiment, which is the method of any of the fifth through seventh embodiments wherein the coupling agent comprises a multifunctional compound.

A ninth embodiment, which is the method of any of the fifth through eighth embodiments wherein the coupling agent comprises silanes, vinyl silanes, epoxy silanes, amino silanes, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, or combinations thereof.

A tenth embodiment, which is the method of the ninth embodiment wherein the vinyl silane comprises vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane, or combinations thereof.

An eleventh embodiment, which is the method of the ninth embodiment wherein the epoxy silane comprises 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, or combinations thereof.

A twelfth embodiment, which is the method of the tenth embodiment wherein the amino silane comprises N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)aniline, diethylaminomethyltriethoxysilane, diethylaminomethylmethyldiethoxysilane, 3-(trimethoxysilylpropyl)diethylamine, 3-(N,N-dimethylaminopropyl)-aminopropylmethyldimethoxysilane, or combinations thereof.

A thirteenth embodiment, which is the method of any of the fifth through twelfth embodiments wherein the first wellbore servicing fluid comprises a preflush fluid.

A fourteenth embodiment, which is the method of any of the fifth through thirteenth embodiments wherein the coupling agent is present in the first wellbore servicing fluid in an amount of from about 0.01 wt. % to about 10 wt. %, based on the total weight of the first wellbore servicing fluid.

A fifteenth embodiment, which is the method of any of the fifth through fourteenth embodiments wherein the relative permeability modifier comprises a water-soluble unmodified polymer; a water-soluble, hydrophilically modified polymer; a water-soluble, hydrophobically modified polymer; an in situ formed polymer; copolymers thereof, blends thereof, derivatives thereof, or combinations thereof.

A sixteenth embodiment, which is the method of any of the fifth through fourteenth embodiments wherein the relative permeability modifier comprises acrylamide, polyacrylamide, hydrolyzed polyacrylamide, or combinations thereof.

A seventeenth embodiment, which is the method of any of the fifth through sixteenth embodiments wherein the relative permeability modifier is present in the second wellbore servicing fluid in an amount of from about 0.01 wt. % to about 10 wt. %, based on the total weight of the second wellbore servicing fluid.

An eighteenth embodiment, which is the method of any of the fifth through seventeenth embodiments wherein the second wellbore servicing fluid comprises a fracturing fluid.

A nineteenth embodiment, which is the method of any of the fifth through eighteenth embodiments wherein the second wellbore servicing fluid comprises a gravel packing fluid.

A twentieth embodiment, which is the method of any of the fifth through nineteenth embodiments wherein the second wellbore servicing fluid further comprises a proppant.

A twenty-first embodiment, which is the method of any of the fifth through twentieth embodiments wherein the subterranean formation comprises sedimentary rocks.

A twenty-second embodiment, which is the method of the twenty-first embodiment wherein the sedimentary rocks comprises shale, mudstone, limestone, sandstone, chalk, or combinations thereof.

A twenty-third embodiment, which is the method of any of the twenty-first through twenty-second embodiments wherein the sedimentary rock comprises silicon-containing minerals.

A twenty-fourth embodiment, which is the method of any of the twenty-first through twenty-third embodiments wherein the water permeability of the formation is decreased by from about 5 vol. % to about 100 vol. %.

A twenty-fifth embodiment, which is a method of servicing a wellbore in a subterranean formation comprising placing into the formation a wellbore servicing fluid comprising a coupling agent and a relative permeability modifier; and allowing the relative permeability modifier to associate with the formation.

A twenty-sixth embodiment, which is the method of the twenty-fifth embodiment wherein the coupling agent comprises an epoxy silane and the relative permeability modifier comprises polyacrylamide.

A twenty-seventh embodiment, which is the method of any of the twenty-fifth through twenty-sixth embodiments wherein the wellbore servicing fluid further comprises a proppant.

A twenty-eighth embodiment, which is the method of any of the twenty-fifth through twenty-seventh embodiments wherein the wellbore servicing fluid further comprises a gravel pack.

A twenty-ninth embodiment, which is the method of any of the twenty-fifth through twenty-eighth embodiments wherein the subterranean formation comprises limestone.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
   introducing into the wellbore a first wellbore servicing fluid comprising a coupling agent;
   allowing the coupling agent to associate with the surface of the formation;
   introducing into the wellbore a second wellbore servicing fluid comprising a relative permeability modifier; and
   allowing the relative permeability modifier to associate with the coupling agent.

2. The method of claim 1 wherein allowing the coupling agent to associate with the surface of the formation; allowing the relative permeability modifier to associate with the coupling agent or both comprises shutting-in the wellbore.

3. The method of claim 2 wherein the wellbore is shut-in for a period of time ranging from 1 hour to 48 hours.

4. The method of claim 1 wherein the coupling agent comprises a multifunctional compound.

5. The method of claim 1 wherein the coupling agent is selected from the group consisting of: silanes, vinyl silanes, epoxy silanes, amino silanes, sulfur silanes, ureido silanes, isocyanate silanes, mercapto silanes, methacryloxy silanes, chloro silanes, alkyl silanes, alkoxy silanes, oximino silanes, acetoxy silanes, phenyl silanes, silazanes, siloxanes, silanols, and any combination thereof.

6. The method of claim 5 wherein the vinyl silane is selected from the group consisting of: vinyl silane, vinyltrichlorosilane, vinyltrimethoxysilane, vinyltriethoxysilane, vinyltris(2-methoxyethoxy)silane, vinyltrisisopropoxysilane, vinyltris(t-butylperoxy)silane, vinyldimethylchlorosilane, vinyldimethylethoxysilane, vinylmethyldichlorosilane, vinylmethyldimethoxysilane, vinylmethyldiethoxysilane, methylvinyldi(N-methylacetylamido)silane, methylvinyldi(5-caprolactam)silane, bis(methyldichlorosilyl)ethane, 2,4,6,8-tetramethyl-2,4,6,8-tetravinyl-cyclotetrasiloxane, 1,3,5-trivinyl-1,3,5-trimethylcyclotrisiloxane, and any combination thereof.

7. The method of claim 6 wherein the epoxy silane is selected from the group consisting of: 3-glycidoxypropyltrimethoxysilane, 3-glycidoxypropyltriethoxysilane, 3-glycidoxypropylmethyldiethoxysilane, 3-glycidoxypropylmethyldimethoxysilane, 2-(3,4-epoxycyclohexyl)-ethyltrimethoxysilane, 2-(3,4-epoxycyclohexyl)-ethyltriethoxysilane, and any combination thereof.

8. The method of claim 6 wherein the amino silane is selected from the group consisting of: N-(3-triethoxysilylpropyl)amine, 3-aminopropylsilanetriol, bis[(3-triethoxysilyl)propyl]amine, N-(3-trimethoxysilylpropyl)amine, bis[(3-trimethoxysilyl)propyl]amine, N-(3-methyldimethoxysilylpropyl)amine, 3-methyldimethoxysilylpropylamine, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(3-trimethoxysilylpropyl)diethylenetriamine, N-(3-methyldimethoxysilylpropyl)diethylenetriamine, methyldimethoxysilylpropylpiperazine, N-3-(trimethoxysilyl)-propylcyclohexylamine, N-3-(methyldimethoxysilyl)-propylcyclohexylamine, N-(trimethoxysilylmethyl)aniline, N-(triethoxysilylmethyl)aniline, N-(3-trimethoxysilylpropyl)aniline, N-(3-triethoxysilylpropyl)aniline, diethylaminomethyltriethoxysilane, diethylaminomethylmethyldiethoxysilane, 3-(trimethoxysilylpropyl)diethylamine, 3-(N,N-dimethylaminopropyl)-aminopropyl-methyldimethoxysilane, and any combination thereof.

9. The method of claim 1 wherein the first wellbore servicing fluid comprises a preflush fluid.

10. The method of claim 1 wherein the coupling agent is present in the first wellbore servicing fluid in an amount of from 0.01 wt. % to 10 wt. %, based on the total weight of the first wellbore servicing fluid.

11. The method of claim 1 wherein the relative permeability modifier is selected from the group consisting of: a water-soluble unmodified polymer; a water-soluble, hydrophilically modified polymer; a water-soluble, hydrophobically modified polymer; an in situ formed polymer; any copolymer thereof; any blend thereof; any derivative thereof; and any combination thereof.

12. The method of claim 1 wherein the relative permeability modifier is selected from the group consisting of: acrylamide, polyacrylamide, hydrolyzed polyacrylamide, and any combination thereof.

13. The method of claim 1 wherein the relative permeability modifier is present in the second wellbore servicing fluid in an amount of from 0.01 wt. % to 10 wt. %, based on the total weight of the second wellbore servicing fluid.

14. The method of claim 1 wherein the second wellbore servicing fluid comprises a fracturing fluid.

15. The method of claim 1 wherein the second wellbore servicing fluid comprises a gravel packing fluid.

16. The method of claim 1 wherein the second wellbore servicing fluid further comprises a proppant.

17. The method of claim 1 wherein the subterranean formation comprises sedimentary rocks.

18. The method of claim 17 wherein the sedimentary rocks are selected from the group consisting of: shale, mudstone, limestone, sandstone, chalk, and any combination thereof.

19. The method of claim 17 wherein the sedimentary rock comprises silicon-containing minerals.

20. The method of claim 1 wherein the water permeability of the formation is decreased by from 5 vol. % to 100 vol. %.

* * * * *